April 1, 1941.  J. PARVU ET AL  2,236,606

DISPENSING FORK

Filed Feb. 1, 1939

INVENTORS
Justin Parvu
John Parvu

BY

Sam. Slotsky
ATTORNEY.

Patented Apr. 1, 1941

2,236,606

UNITED STATES PATENT OFFICE 2,236,606

DISPENSING FORK

Justin Parvu and John Parvu, Sioux City, Iowa

Application February 1, 1939, Serial No. 253,981

3 Claims. (Cl. 30—129)

Our invention relates to a fork for dispensing purposes.

An object of our invention is to provide a fork which is usable for piercing and holding edible or other products for dispensing purposes.

A further object of our invention is to provide attached mechanism to such a fork which will remove the objects attached at the end of the fork.

A further object of our invention is to provide a mechanism to accomplish the above mentioned object, which will not get out of order, and which automatically returns to normal position.

A further object of our invention is to provide the above mentioned objects in a simple construction, which will not jam, and which will function efficiently.

With these and other objects in view, our invention consists in the construction, arrangement and combination of the various parts of our device, whereby the objects contemplated are attained, as hereinafter more fully set forth, pointed out in our claims, and illustrated in the accompanying drawing, in which:

Figure 1:
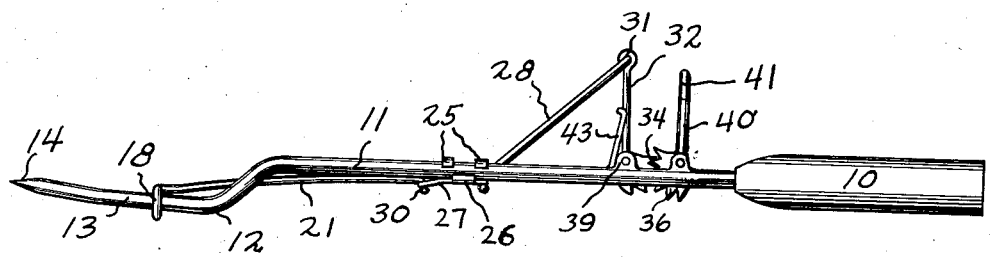
Figure 1 is a side elevation of the fork.
Figure 2:
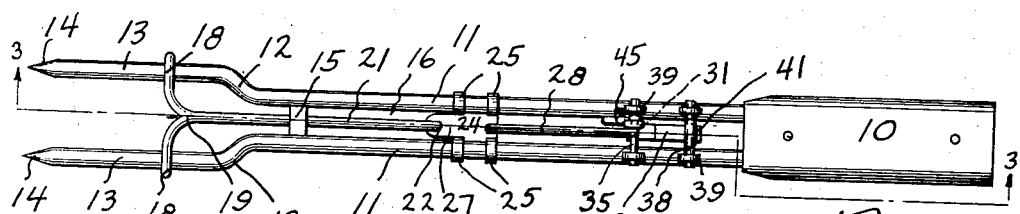
Figure 2 is a plan view thereof.

The principal difficulty encountered with forks, especially larger forks, is that after the food products, such as meat, fish, and the like, are pierced, it is generally necessary to shake the fork considerably to loosen such products. Our invention anticipates and remedies this deficiency by providing means for automatically forcing such products off of the end of the fork.

We have represented the handle of the fork by the character 10. Projecting from the handle 10, are the two cylindrical members 11, which terminate at 12 into the tines 13, which are sharply pointed at 14. A cross brace is provided at 15, leaving the hollow space 16.

The forcing member, which is generally indicated by the character 17, comprises two end loops 18, which rather loosely receive the tines 13. The loops 18 extend into the portion 19, which is recessed from the loops 18, so that an open portion will be provided at 20, so that there will be no undue jamming or clogging against the product which is to be ejected.

The portion 19 extends into the integral rod 21, which is loosely received at 22 in an opening 23, which is formed within the slidable carrier member 24. The member 24 includes the four upper arcuate prongs 25, which rest upon the members 11, and a pair of lower projecting ears 26, projecting under the members 11, thereby locking the carrier 24 against vertical movement, although allowing horizontal slidable movement of the same.

The carrier 24, extends into the extended lip 27, which includes the aforesaid opening 23. Loosely and pivotally attached at the rear end of the carrier 24 is the further rod 28, which is received within the opening 29 of the carrier, and suitably headed over to prevent removal thereof, similar to the head-over portion 30, at the extremity of the rod 21.

The rod 28 extends angularly and upwardly, and is received within the opening 31 at the end of the further rod 32. The rod 32 normally is in a vertical position, and terminates into the gear member 33, which includes a series of teeth 34. The member 33 is mounted upon the pin 35, which pin is received within the upstanding ears 39, which ears are attached to the members 11.

The teeth 34 are adapted to mesh or engage the further teeth 36 of the further member 37. The member 37 is also attached to the pin 38, which is received within the ears 39, which ears are attached to the members 11. The member 37 extends into the integral rod 40, which terminates into the widened thumb portion 41.

A spiral spring 42 is secured at 45 to one side of the rods 11, and the other end extends upwardly into the portion 43, which is suitably bent, at 44, about the member 32, so that normally it carries the member 32 to the vertical position as shown in Figure 1.

Figure 3:
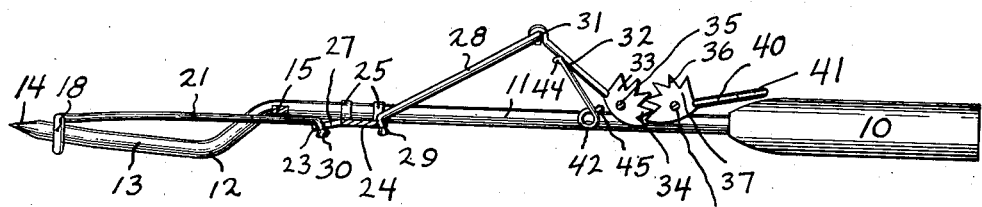
Figure 3 is a sectional view of Figure 2, taken along the lines 3—3 thereof.

It will now be seen from the foregoing construction that after meat or other edible product is retained by means of the tines 13, it is only necessary to then press the thumb lever 40 downwardly against the handle by pressing against the portion 41, (see Fig. 3). The co-action of the gears 33 and 37 then forces the rod 32 away from its vertical position, which forces the rod 28 outwardly which in turn forces the carrier 24 outwardly, the co-action of which carrier, the ejecting rod 21, and the member 17 forces the loops 18 to the outer portion as shown in Fig. 3. This positive action of the ejecting member then forces the material off of the tines of the fork and by simply releasing the thumb, the device will automatically spring back to normal position.

Figure 4:
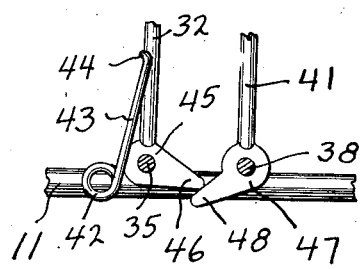
Figure 4 is an enlarged detail of a modified form.

A further slightly modified form is shown in Fig. 4, in which the gears 33 and 37 are not necessary, thereby rendering a device simpler in that respect. In this form of device the cam portion 45 is attached to the rod 32, which cam portion has a projecting, rounded member 46, which is adapted to co-act with the further cam member 47, having the projecting portion 48. The corresponding levers 41 and 32 will be thrown in the same manner through the co-action of these cam portions without the necessity of using gears, and the extending portions 46 and 48 are made sufficiently long to insure maximum angle of throw of the levers.

A small pin 48a is attached to one of the members 11 as shown, the purpose of which is to limit forward movement of the thumb member 40.

It will now be seen that we have provided a dispensing fork which will remove the objects attached at the end of the fork, a mechanism which will not get out of order, and which returns to normal position automatically, and which is of simple construction.

Some changes may be made in the construction and arrangement of the parts of our invention without departing from the real spirit and purpose of our invention, and it is our intention to cover by our claims any modified forms of structure or use of mechanical equivalents, which may be reasonably included within their scope.

We claim as our invention:

1. A dispensing fork comprising tines, an ejecting member slidably mounted on said tines, means for manually causing slidable movement of the ejecting member from the fork handle, including a thumb lever, a gear attached to and actuated by said thumb lever, means cooperant with said gear to cause said slidable movement of said ejecting member, including a further vertical lever, a gear attached thereto meshing with said thumb lever gear, a rod pivotally attached to said vertical lever, a carrier slidably received on the body of said fork to which said rod is pivotally secured, said ejecting member attached to said carrier.

2. A dispensing fork comprising tines, an ejecting member slidably mounted on said tines, means for manually causing slidable movement of the ejecting member from the fork handle, including a thumb lever, a gear attached to and actuated by said thumb lever, means cooperant with said gear to cause said slidable movement of said ejecting member, including a further vertical lever, a gear attached thereto meshing with said thumb lever gear, a rod pivotally attached to said vertical lever, a carrier slidably received on the body of said fork to which said rod is pivotally secured, said ejecting member attached to said carrier, said ejecting member having a recessed portion to prevent adhering of products held on said tines.

3. A dispensing fork comprising tines, an ejecting member slidably mounted on said tines, means for manually causing slidable movement of the ejecting member from the fork handle, including a thumb lever, a cam member attached to said thumb lever, a further cam member actuated by said cam member, a vertical lever attached to said further cam member, a rod pivotally attached to said vertical lever, a carrier slidably received on the body of said fork to which said rod is pivotally secured, said ejecting member attached to said carrier.

JUSTIN PARVU.
JOHN PARVU.